UNITED STATES PATENT OFFICE.

PIERRE JEAN RENÉ POSTEL-VINAY, OF PARIS, FRANCE, ASSIGNOR TO SOCIETE DES MOTEURS SALMSON (SYSTEME CANTON-UNNE), OF BILLANCOURT, FRANCE.

BRACKET FOR ACCESSORIES OF EXPLOSION-ENGINES.

1,308,807. Specification of Letters Patent. Patented July 8, 1919.

Application filed December 20, 1918. Serial No. 267,726.

*To all whom it may concern:*

Be it known that I, PIERRE JEAN RENÉ POSTEL-VINAY, citizen of the Republic of France, residing at 46 Boulevard de la Tour-Maubourg, Paris, Seine, in the Republic of France, have invented new and useful Improvements in Brackets for Accessories of Explosion-Engines, of which the following is a specification.

This invention relates to a supporting member or bracket formed of a specially shaped casting and adapted for use in aviation engines for supporting a water pump, an oil pump, a speed reducer for speedometer and two ignition magnetos. Said bracket is preferably cast of aluminium and placed at the rear part of the engine whereby the different devices carried by the same are conveniently located.

In the annexed drawing given by way of example:

Figure 1:
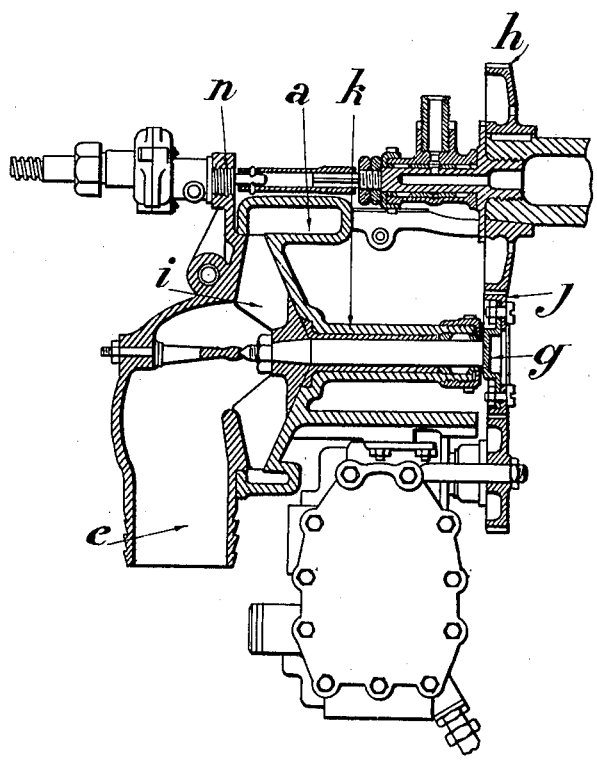
Figure 1 is a vertical section along the line A—A, Fig. 2, showing the improved bracket together with the different accessories carried by the same.
Figure 2:
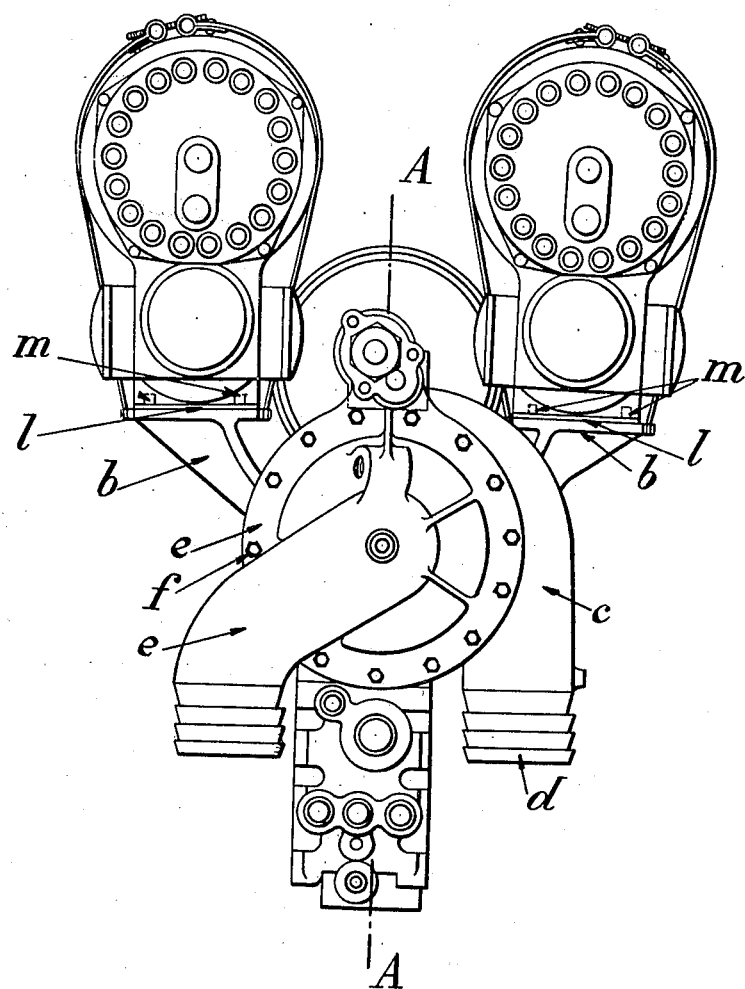
Fig. 2 is a corresponding end view.
Figure 3:
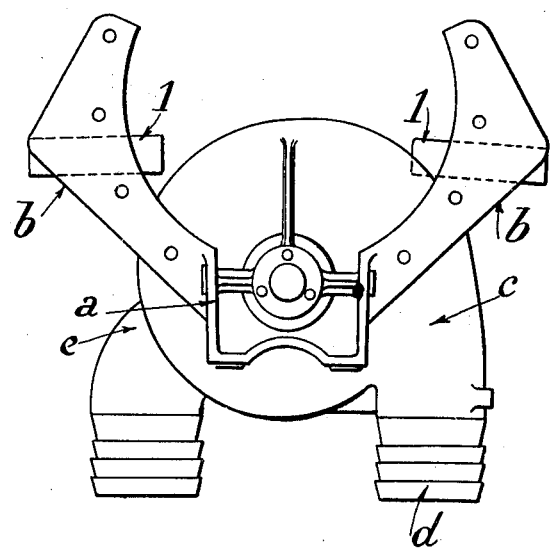
Figs. 3 and 4 are respectively an end view and a plan view of the detached bracket.
Figure 4:
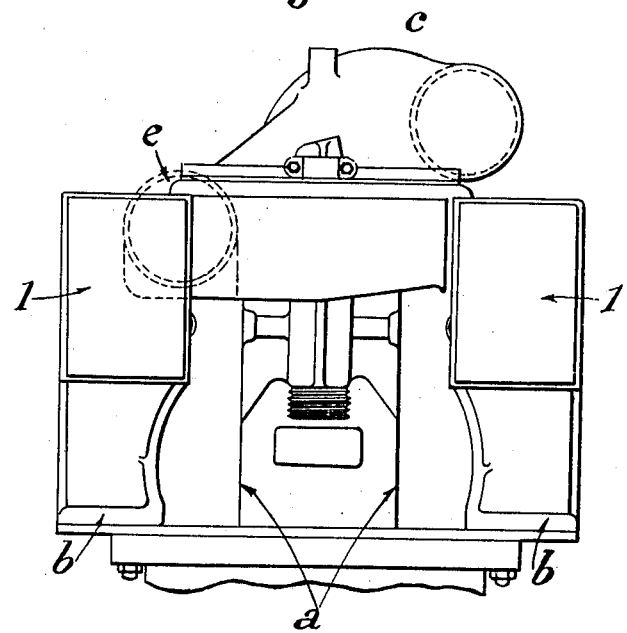

As shown in the drawing, the bracket *a* is provided with two side legs or flanges *b* by means of which the bracket may be bolted to the engine. The bracket is preferably formed of an aluminium casting. The body of bracket *a* forms the casing of a centrifugal water pump having a spirally shaped outlet conduit *c*, the cross section of which gradually increases toward the outlet nozzle *d*. The water pump casing is closed by a removable cover *e* provided with the inlet nozzle and secured to a flange on the bracket *a* by means of bolts *f*.

The central part of the bracket *a* forms a sleeve or elongated bearing *k* in which the shaft *g* of the water pump is journaled. The shaft *g* carries at one end the rotor *i* of the water pump and, at the other end, a toothed wheel *j* meshing with a toothed wheel *h* keyed on the engine shaft.

In its upper part, the bracket *a* is provided with two machined horizontal faces or seats *l* which are symmetrically disposed with respect to the vertical axis A—A and serve to receive the ignition magnetos. The base part of the latter is provided with recesses into which centering pins *m* fixed upon the bracket *a* are adapted to project, whereby the magnetos are held in the exact position desired. The magnetos are secured in place by means of fastening straps provided at their ends with eyes which are hooked upon attaching pins or bolts provided on the bracket *a*.

In its lower part, the bracket *a* is also provided with a flat seat from which the oil pump is suspended by means of four bolts. The oil pump is driven by a toothed wheel in mesh with the pinion *j* of the water pump.

The speed reducer for the counter is provided with a threaded part *n* which is screwed into an interiorly threaded boss provided on the water pump cover *e*, coaxially with the engine shaft.

Having now described my invention, what I claim as new and desire to secure by Letters Patent is:

1. The combination in an explosion engine of a bracket formed of a molded casting and comprising a body which forms the casing of a water pump and a central elongated bearing, a shaft rotatably mounted in said bearing, a water pump rotor carried by said shaft, a cover removably secured to the said water pump casing, side legs integral with the bracket for attachment of the same to the engine, two lateral horizontal seats formed on the bracket and adapted to receive two ignition magnetos and a horizontal seat formed on the bracket and adapted to receive an oil pump.

2. The combination in an explosion engine of a bracket formed of a molded casting and comprising a body which forms the casing of a water pump and a central elongated bearing, a shaft rotatably mounted in said bearing, a water pump rotor carried by said shaft, a cover removably secured to the said water pump casing, means on said cover for supporting the speed reducer of a speedometer, side legs integral with the bracket for attachment of the same to the engine, two lateral horizontal seats formed on the bracket and adapted to receive two ignition magnetos and a horizontal seat formed on the bracket and adapted to receive an oil pump.

3. The combination in an explosion engine of a bracket formed of a molded casting and comprising a body which forms the casing of a water pump and a central elongated bearing, a shaft rotatably mounted in said bearing, a water pump rotor carried by said shaft, a cover removably secured to the said water pump casing, side legs integral with the bracket for attachment of the same to the engine, two lateral horizontal seats formed on the bracket and adapted to receive two ignition magnetos, centering pins on said seats, fastening straps for the said magnetos, means for detachably securing the fastening straps to the bracket and a horizontal seat formed on the bracket and adapted to receive an oil pump.

4. The combination in an explosion engine of an engine shaft, a pinion on said engine shaft, a bracket formed of a molded casting and comprising a body which forms the casing of a water pump and a central elongated bearing, a shaft rotatably mounted in said bearing, a water pump rotor carried by said shaft at one end, a pinion keyed on the opposite end of said shaft and meshing with the pinion on the engine shaft, a cover removably secured to said water pump casing, side legs integral with the bracket for attachment of the same to the engine, two lateral horizontal seats formed on the bracket and adapted to receive two ignition magnetos, a horizontal seat formed on the bracket, an oil pump secured on said horizontal seat, said oil pump comprising a driving shaft, and a pinion keyed on said driving shaft and meshing with the pinion on the water pump pinion.

In testimony whereof I have signed my name to this specification.

PIERRE JEAN RENÉ POSTEL-VINAY.